United States Patent

[11] 3,580,108

[72] Inventor Spencer H. Mieras
Muncie, Ind.
[21] Appl. No. 881,346
[22] Filed Dec. 2, 1969
[45] Patented May 25, 1971
[73] Assignee Borg-Warner Corporation
Chicago, Ill.

[54] DIFFERENTIAL MECHANISM
5 Claims, 3 Drawing Figs.
[52] U.S. Cl. ................................................ 74/711
[51] Int. Cl. ................................................ F16h 1/44
[50] Field of Search ................................... 74/710.5, 711

[56] References Cited
UNITED STATES PATENTS
1,750,981  3/1930  Wildhaber .................... 74/711
2,234,591  3/1941  Fitzner ......................... 74/711
3,051,020  8/1962  Hartupee ...................... 74/710.5
3,264,901  8/1966  Ferbitz et al. ................. 74/711
3,457,807  7/1969  Altmann ....................... 74/711

FOREIGN PATENTS
35,800  3/1954  Poland ........................ 74/711
1,102,679  5/1955  France ......................... 74/711

Primary Examiner—Carlton R. Croyle
Assistant Examiner—Thomas C. Perry
Attorneys—Donald W. Banner, William S. McCurry and John W. Butcher ABSTRACT: A limited slip differential mechanism having preloaded conical friction members which retard differential action. The mechanism includes camming means operable independently of the mechanism side gears to proportionally decrease friction preload force on the conical friction members in response to increasing input torque.

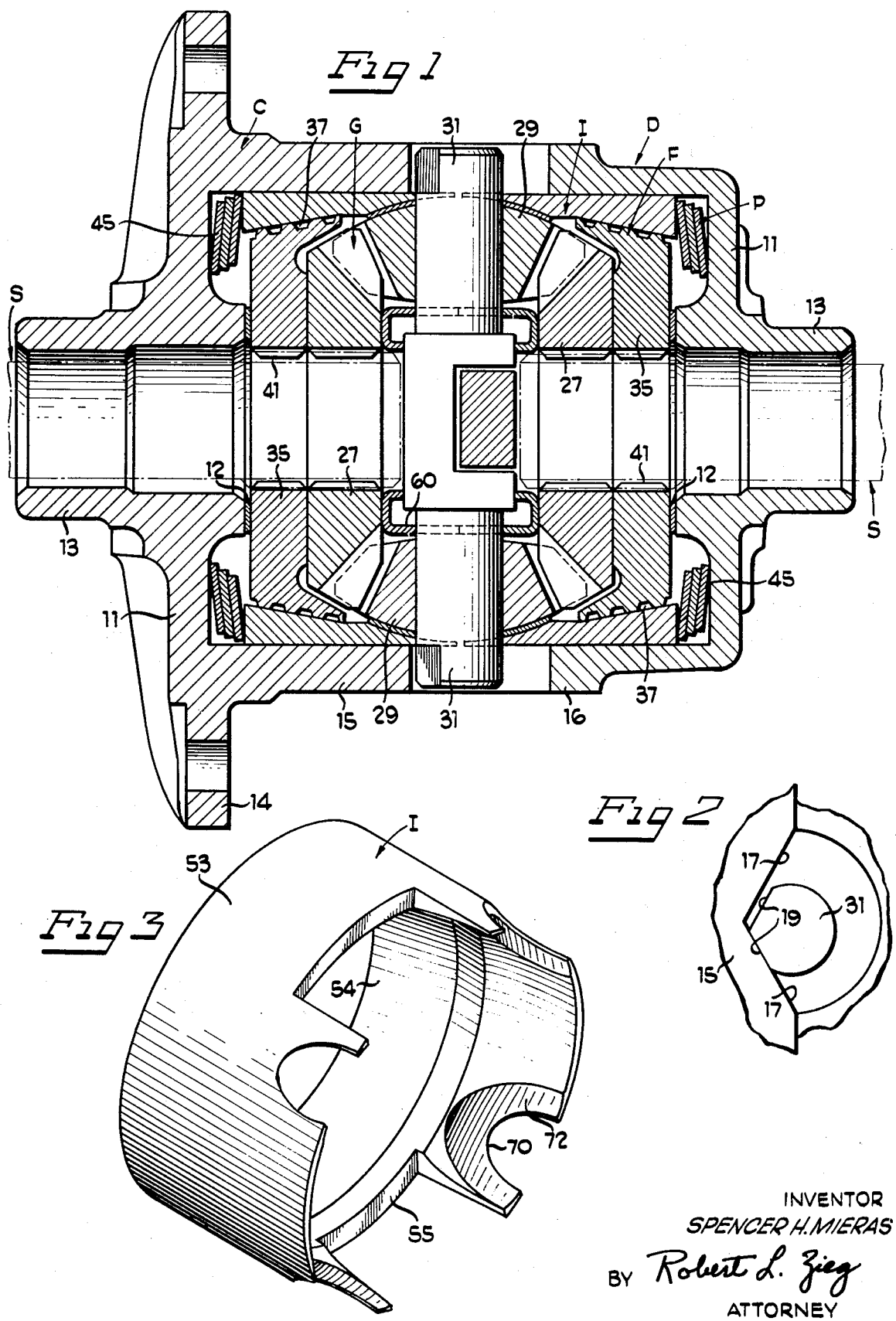
INVENTOR
SPENCER H. MIERAS
BY Robert L. Zieg
ATTORNEY

DIFFERENTIAL MECHANISM

BACKGROUND OF THE INVENTION

This invention relates to a limited slip differential mechanism. More particularly, it relates to a limited slip differential mechanism utilizing conical clutch members to provide resistance to differential action and which further includes means responsive to input torque to vary the force holding the clutch members in engagement. The invention is particularly suited for application in the drive line of a vehicle utilizing at least two drive wheels which receive power from a pair of coaxially aligned relatively rotatably output shafts or drive axles.

Arrangements have been devised which provide an initial or preestablished resistance to differential action and which operate to reduce this resistance proportionally in response to an increase in input torque. These systems have included bulky, disc pack clutch arrangements mounted outboard of the differential casing or inside of an unduly elongated differential case. Copending application, Ser. No. 842,182, filed July 16, 1969, of common assignee, covers an improved differential mechanism wherein the separating force of the differential gears is utilized to reduce the preload force holding the clutch members in engagement proportionally in response to increasing input torque. The present invention provides an improved form of differential mechanism which includes conical friction members which retard differential action and which includes a mechanism for reducing the preload force which differs from that shown in the mentioned copending application in that a camming means operable independently of the mechanism side gears is utilized to decrease the preload force holding the conical friction members in contact in response to increasing input torque.

SUMMARY OF THE INVENTION

Very generally the present invention provides a limited slip differential mechanism having an initial preestablished resistance to differential action and which includes camming means operable independently of the mechanism side gears to reduce the resistance to differential action proportionally in response to an increase in input torque.

The differential mechanism of the present invention includes at least one conically shaped insert associated with the mechanism casing and at least one conically shaped clutch member associated with the output shafts or driving axles which define a conical friction surface. Biasing means urge the conically shaped insert associated with the mechanism casing into frictional engagement with the conical friction surface with a predetermined force to establish a resistance to differential action. Camming means operable between the mechanism casing and the conically shaped insert associated with the casing are effective to reduce the force holding the friction surfaces in engagement proportionally in response to an increase in input torque.

DESCRIPTION OF THE DRAWINGS

FIG. 1 is a sectional view of a differential mechanism illustrative of the principles of the present invention;

FIG. 2 is a fragmentary top view on an enlarged scale of a portion of the apparatus of FIG. 1; and FIG. 3 is a perspective view of a portion of the apparatus of FIG. 1.

DETAILED DESCRIPTION

Referring now to the drawings, there is shown a differential mechanism illustrative of the principles of the present invention. The mechanism, generally designated D, is disposed in operative association with a pair of coaxially aligned, relatively rotatable, output shafts S, shown in phantom lines. These shafts may form the driving axle of an automotive or commercial vehicle, farm tractor, or other device which requires distribution of torque to two utilization points where relative movement between shafts occurs under certain conditions of operation.

The mechanism D includes a casing C surrounding adjacent ends of the output shafts S. The casing is adapted to receive input torque from a drive line system (not shown). A bevel gear system generally designated G is connected between the casing C and the shafts S and transmits rotational effort to the shafts while simultaneously allowing relative rotation between shafts, when required, as when the vehicle negotiates a curve or corner.

A pair of friction clutches F provides the desired resistance to differential action. Each clutch includes a friction surface associated with the casing C and a friction surface associated with one of the output shafts S. Frictional engagement of these surfaces provides a direct path for transmission of rotational effort from the casing to the output shafts independent of the bevel gear system G. The clutches thus modify the normal differential characteristics of the mechanism and torque is transmitted to both shafts even though they may experience unequal loading or traction.

Limited slip differential mechanisms generally include at least one clutch operatively associated with the differential casing and one of the output shafts to provide the resistance to differential action. In the illustrated embodiment, two clutches are provided, one for each output shaft, although in many instances one clutch member associated with the output shafts could be used.

The friction surfaces of the clutches F are maintained in engagement by spring packs P to provide a preload to insure a predetermined initial resistance to differential action. Each of the clutches includes a removable insert I which is connected to the casing C for rotation therewith and which forms the friction surface of the clutches F associated with the casing.

The casing C is formed by two generally cup shaped halves 15 and 16 joined together by a plurality of bolts or other suitable fasteners (not shown). One casing half includes a radially directed flange 14 to which is secured a ring gear (not shown) associated with the drive line system to receive input torque.

The casing halves define a generally cylindrical wall and a pair of spaced apart walls 11 transverse to the centerline of the output shafts. The walls cooperate to define an internal cavity surrounding the adjacent ends of the output shafts S.

Each transverse wall 11 includes a longitudinally elongated hub 13 adapted to receive one of the output shafts S. An annular thrust washer 12 is provided between each clutch member and each wall 11 internally of the cavity defined by the casing C.

In the illustrated embodiment the shafts S are not journaled in the hubs 13, but rather, the hubs are adapted to receive bearings (not shown) which position the mechanism within the axle assembly.

The casing C defines a plurality of camming apertures disposed about the cylindrical wall and formed partially in each of the casing halves 15 and 16. In the illustrated embodiment, four such apertures are provided at approximately 90° intervals about the cylindrical wall to form pairs disposed 180° apart.

Each aperture of one pair includes two cam surfaces 17 forming a V-shaped notch in the casing half 15, and a mating generally oval shaped cutout in the casing half 16. The apertures of the other pair are each defined by two cam surfaces 17 forming a V-shaped notch in the casing half 16 and a mating generally oval shaped cutout formed in the casing half 15.

Referring now to the bevel gear system G, best seen in FIG. 1, there is provided an arrangement which transmits output torque to the shafts S and at the same time allows relative rotation between shafts when required, as when a vehicle is cornering.

The bevel gear system includes a pair of side gears 27 each of which is connected to one of the shafts S for rotation therewith. The side gears are splined to the adjacent ends of the shafts S to permit axial movement of the shafts with respect to the gears.

The side gears 27 are in constant mesh with four pinion gears 29 supported by a pair of crossed pinion pins 31. The pins extend transversely of the casing internal cavity intermediate the walls 11 and are supported for rotation with the casing.

As can be appreciated, rotation of the differential casing C causes the pinion pins 31 to revolve in a plane transverse to the centerline of the output shafts S. The pinion gears 29 therefore transcribe a cylindrical orbit or path about the centerline of the shafts S. Since the pinion gears 29 are in mesh with the side gears 27, the side gears are caused to rotate and thereby transmit torsional effort to the output shafts.

If the output shafts are required to rotate at unequal speeds, as when cornering, the pinion gears 29 not only revolve about the centerline of the output shafts, but also rotate about the pinion pins 31 allowing relative movement between the side gears 27. Consequently, the output shafts S rotate relative to each other as well as relative to the casing C.

The pinion pins 31 are connected to the casing C at the camming apertures formed in the casing cylindrical walls. Each of the pinion pins includes opposite end portions having cam follower surfaces 19 formed in a complementary V-shape which engages the V-shaped notches defined by the cam surfaces 17 and complementary cam follower surfaces 10 provide for imparting axial force to the pinion pins 31 regardless of the direction of rotation of the mechanism casing.

As stated, the camming surfaces 17 of one pair of camming apertures are oppositely disposed with respect to the camming surfaces of the other pair. Therefore, application of torsional effort to the casing C will impart an axial force to one pinion pin 31 in one direction and an axial force to the other pinion pin 31 in the opposite direction.

Differentiation, i.e., relative rotation between output shafts, which is inherently possible by virtue of the transfer of torsional effort from the casing C to the shafts S through the bevel gear system C is resisted by the frictional engagement of the clutches F.

Each clutch includes a frustoconical clutch member 35 having an internally splined bore 41 connected to one of the shafts S. Each clutch member includes a conical friction surface which is adapted for frictional engagement by one of the inserts I. A spirally progressing groove 37 is provided in the conical surface of each clutch member 35 for distribution of oil or other lubricants.

As best seen in FIGS. 1 and 3, the conical seat surfaces which frictionally engage the clutch members 35 are provided by the removable inserts I which form conical friction surfaces 54 of the clutches F associated with the casing C. The surfaces 54 are conically shaped and engage the conical surfaces of the associated clutch members 35.

The surface 54 of each insert I is shaped to converge toward the adjacent wall 11 of the mechanism casing C. That is, the small ends of the cones are directed toward the hubs 13 of the casing. The clutch members 35 fit inside the inserts, the cone surfaces thereof being in frictional contact with the surfaces 54. Such an arrangement makes a compact clutch contained completely within the differential case.

The inserts I each include a generally cylindrical wall portion 53 which contacts the internal surface of the cylindrical wall of the casing C to support the inserts within the internal cavity.

The inserts are held against rotation relative to the casing C by pinion pin contacting surfaces defining semicircular notches 70. These surfaces engage the pinion pin outer peripheral surface to provide a driving engagement between the pins and the inserts.

Further, the pinion pin contacting surfaces contact the pinion pins 31 in a manner such that axial force imparted to a pinion pin imparts a corresponding axial force to the insert. Since the crossed pins 31 will have axial force imparted thereto in opposite directions, each pin will be effective to apply axial force to one insert upon application of torsional effort to the casing C.

Each insert further includes suitably shaped semispherical surfaces 72 which act as bearing seats for the pinion gears 29. Also, slots 55 are provided which allow ingress of lubricant through appropriately formed openings (not shown) in the casing C.

The axial force necessary to effect frictional engagement of the conical surface 54 of each insert I with the associated conical clutch member 35 is provided by the spring packs P. Each spring pack P includes a plurality of spring type belleville washers 45 acting between one side wall 11 of the casing C and one insert I. The springs thus establish a preload force holding the conical surfaces 54 of the insert I and the complementary conical surfaces of the clutch members 35 in engagement to provide a path for transmission of torsional effort from the casing C to the output shafts S which is independent of the bevel gear system G.

The size and number of springs used in each spring pack will control the force applied to the clutches F and therefore, the degree of inherent resistance to differential action. It must be appreciated that any suitable biasing arrangement could be used without departing from the scope of the invention.

As can be appreciated, application of axial biasing forces upon the inserts I by the spring packs P will provide a force tending to urge clutch members 35 and side gears 27 toward the center of the mechanism cavity. A reaction block 60 is therefore provided which prevents axial movement of the side gear 27 toward the pinion pins 31 and serves to provide the reaction force necessary to effect frictional engagement of the clutches F.

The relative spacing of the side gears 27 and clutch members 35 is such that the side gears 27 mesh properly with the pinion gears 29 and further is such that the clutch members are in closely spaced relation to the thrust washers 12 formed upon the transverse walls 11. Axial movement of the clutch members 35 due to side thrust developed by virtue of transmission of torsional effort through the intermeshed side gears 27 and pinion gears 29 is prevented by contact of the side gears with the washers 12.

OPERATION

The spring packs P urge the inserts I into frictional engagement with the clutch members 35 with a predetermined force providing the initial resistance to differential action or prevailing preload. The inserts I are in driving engagement with the casing C and the clutch members 35 are splined to the shafts S. A drive path through the frictionally engaged clutches is therefore provided directly from the casing to the shafts. As input torque is applied to the casing C in pinion pins 31 will rotate in a plane transverse to the centerline of the output shafts S. The pinion gears 29 will then transcribe a cylindrical orbit about the output shafts and will, by virtue of their intermeshed relation with the side gears, effect rotation of the output shafts.

As the input torque transmitted to the shaft increases, a corresponding opposition or reaction force is created at the drive wheels which constitutes the load that must be overcome to cause the shafts to rotate. This condition causes the casing C to move with respect to the pinion pins 31 which are held from rotation by the intermeshed relation of the pinion gears and side gears and the wheel load.

As a result of the engagement of the cam surfaces 17 of the casing C and the cam follower surfaces 19 of the pinion pins 31, an axial force is developed on the pinion pins, the force on one pin being in one direction and the force on the other pin being in the opposite direction. The amount of axial force imparted to the pins is proportional to the magnitude of the torque transfer.

Axial force on the pinion pins 31 causes a corresponding axial force on the inserts I against the force of the spring packs P. This results in a proportional reduction in the force on the clutches F and provides a proportional reduction in the resistance to differential action. This reduction of the prevailing preload force is independent of side gear thrust of the bevel gear system.

A differential mechanism has been provided which includes conical clutch members which are frictionally engaged to provide resistance to differential action and which includes camming means operable to reduce the force on the clutch members proportionally with increasing input torque. Reduction of the force on the clutches F under normal driving conditions will reduce wear, prevent chatter and heating and eliminate excessive strain on the gearing.

Various features of the invention have been particularly shown and described. However, it should be obvious to one skilled in that art that various modifications may be made therein without departing from the scope of the invention.

What I claim is:

1. A limited slip differential mechanism comprising: a differential casing adapted to receive an input torque for transmission to a pair of coaxially aligned relatively rotatable output shafts, differential gearing within said casing for transmitting said torque from said casing to the output shafts, differentiation retarding means including at least one removable insert connected to said casing for rotation therewith and including a conical surface, at least one conically shaped clutch member adapted for attachment to the output shafts, said conical surface of said insert frictionally engaging said conically shaped clutch member, resilient means urging said conical surface of said insert into said frictional engagement with a predetermined force, and means responsive to torque applied to the mechanism to decrease said predetermined force proportionally with increasing input torque.

2. A limited slip differential mechanism as claimed in claim 1 wherein said differentiation retarding means includes a pair of said inserts connected to said casing for rotation therewith, each one of which includes a conical surface and a pair of conically shaped clutch members each one of which is adapted for attachment to one of the output shafts, said biasing means urging each said insert into frictional engagement with one of said conical clutch members.

3. A limited slip differential mechanism as claimed in claim 2 wherein said differential gearing includes a pair of crossed pinion pins connected to said casing for rotation therewith, a pair of side gears each one of which is adapted to be connected to one of the output shafts, and a plurality of pinion gears supported by said pinion pins in mesh with said side gears, and wherein said means responsive to torque applied to said mechanism to decrease said predetermined force of said differentiation retarding means proportionally with increasing input torque includes camming means operable between said mechanism casing and said pinion pins to apply a force on said inserts against the force of said biasing means.

4. A limited slip differential mechanism as claimed in claim 3 wherein said camming means includes at least two pairs of camming apertures formed in said mechanism casing, each one of said apertures including a pair of cam surfaces forming a V-shaped notch, the disposition of said cam surfaces of said camming apertures of one of said pairs being opposite to the disposition of said cam surfaces of said camming apertures of the other pair thereof, and wherein said crossed pinion pins each include opposite end portions having cam follower surfaces formed in a complementary V-shape which engage said V-shaped notches defined by said cam surfaces of said pairs of camming apertures, application of input torque to said casing causing said cam follower surfaces to impart an axial force on said pinion pins, the opposite disposition of said notches defined by said cam surfaces causing the axial force on one of said pins to be in one direction and the other thereof to be in the other direction, each one of said pinion pins contacting at least one of said inserts in a manner such that said pinion pin imparts corresponding axial forces on said insert acting in opposition to the force of said biasing means.

5. A limited slip differential mechanism comprising a differential casing containing differential gearing adapted to receive an input torque for transmission to a pair of coaxially aligned and relatively rotatable output shafts, said differential gearing including a pair of side gears fast on the output shaft and pinion gears rotatably mounted in said casing on cross pins, a removable insert having a conical surface and being adapted to move axially of and to rotate with said casing, said insert being in contact with said cross pins, conically shaped clutch members fast with said output shafts, spring type washers resiliently urging said insert axially into clutching engagement with said clutch members with a predetermined force for retarding differential action, means responsive to torque applied to the casing to apply a force on said insert in opposition to said predetermined force, said last mentioned means comprising cam surfaces on said casing acting on said cross pins when torque is applied thereto.